Figure 1:
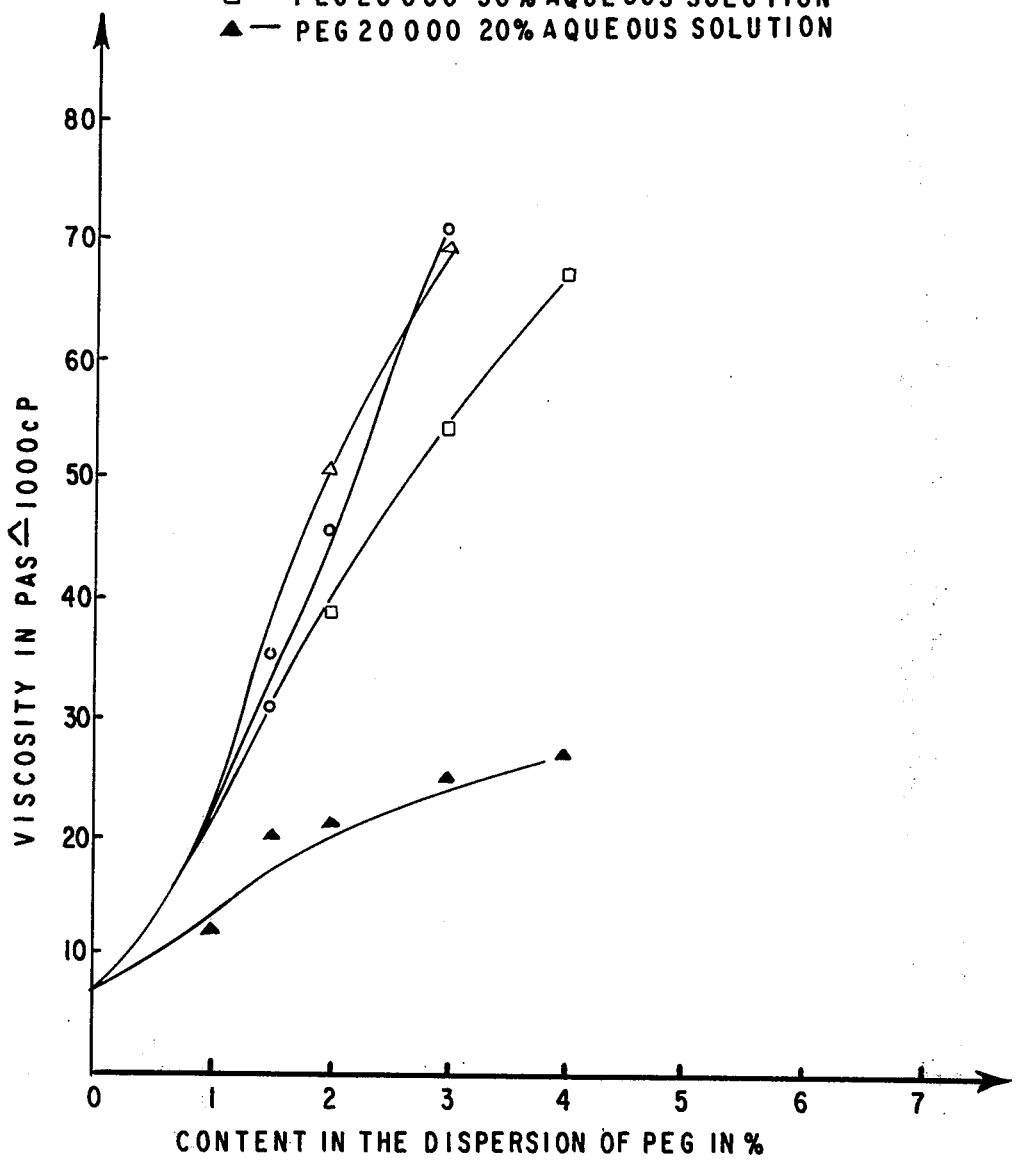

United States Patent [19]

Kemenater et al.

[11] 4,133,791

[45] Jan. 9, 1979

[54] PROCESS FOR THE PREPARATION OF AQUEOUS ETHYLENE COPOLYMER DISPERSIONS WITH HIGH VISCOSITIES WHICH CONSISTS ESSENTIALLY OF POLYMERIZING IN THE PRESENCE OF POLYVINYL ALCOHOL AND MIXING WITH CERTAIN POLYALKYLENE GLYCOLS

[75] Inventors: Christof Kemenater; Gerhard Bade, both of Burghausen, Germany

[73] Assignee: Wacker-Chemie GmbH, Munich, Germany

[21] Appl. No.: 849,500

[22] Filed: Nov. 7, 1977

[30] Foreign Application Priority Data

Dec. 30, 1976 [DE] Fed. Rep. of Germany ....... 2659545

[51] Int. Cl.$^2$ .............................................. C08L 29/04
[52] U.S. Cl. ........................ 260/29.6 WA; 260/29.6 E
[58] Field of Search .................. 260/29.6 WA, 29.6 E

[56] References Cited

U.S. PATENT DOCUMENTS

| | | | |
|---|---|---|---|
| 3,692,723 | 9/1972 | Kasagi et al. | 260/29.6 E |
| 3,830,761 | 8/1974 | Lenney | 260/29.6 WA |
| 4,035,329 | 7/1977 | Wiest et al. | 260/29.6 WA |

Primary Examiner—M. J. Welsh
Attorney, Agent, or Firm—Hammond & Littell

[57] ABSTRACT

A process for the preparation of an aqueous ethylene-containing copolymer dispersion with viscosities above 20 Pas (measured with a Brookfield viscosimeter at 10 rpm) which consists essentially of (1) polymerizing an aqueous monomer mixture of ethylene and at least one monomer copolymerizable with ethylene under conventional ethylene copolymerization conditions in the presence of from 1% to 15% by weight of polyvinyl alcohol with a degree of hydrolyzation of 70% to 100%, to a solids content of from 30% to 60% by weight, to give a copolymer dispersion, (2) evenly distributing from 1% to 8% by weight of water-soluble polyalkylene glycols having a molecular weight of between 6,000 and 100,000 selected from the group consisting of polyethylene glycol and mixtures of polyethylene glycol/polypropylene glycol, in said copolymer dispersion, and (3) recovering said aqueous ethylene-containing copolymer dispersion with viscosities above 20 Pas.

11 Claims, 2 Drawing Figures

PROCESS FOR THE PREPARATION OF AQUEOUS ETHYLENE COPOLYMER DISPERSIONS WITH HIGH VISCOSITIES WHICH CONSISTS ESSENTIALLY OF POLYMERIZING IN THE PRESENCE OF POLYVINYL ALCOHOL AND MIXING WITH CERTAIN POLYALKYLENE GLYCOLS

RELATED ART

The preparation of high viscosity polymer dispersions in autoclaves equipped with stirrers frequently represents a major problem, since it is more and more difficult with increasing viscosity to remove the reaction energy liberated in the polymerization process. In the case of vinyl acetate homopolymerization, the problem of the heat transport of the heat of reaction can be solved by returning the volatilizing monomer into the polymerization process after cooling. This possibility, however, is not present in the case of ethylene copolymerization in pressure autoclaves.

OBJECTS OF THE INVENTION

An object of the present invention is to find a process for the increase of the viscosity of ethylene-containing plastics dispersions where the polymerization at high viscosities could be avoided.

Another object of the present invention is the development of a process for the preparation of an aqueous ethylene-containing copolymer dispersion with viscosities above 20 Pas (measured with a Brookfield viscosimeter at 10 rpm) which consists essentially of (1) polymerizing an aqueous monomer mixture of ethylene and at least one monomer copolymerizable with ethylene under conventional ethylene copolymerization conditions in the presence of from 1% to 15% by weight of polyvinyl alcohol with a degree of hydrolyzation of 70% to 100%, to a solids content of from 30% to 60% by weight, to give a copolymer dispersion, (2) evenly distributing from 1% to 8% by weight of water-soluble polyalkylene glycols having a molecular weight of between 6,000 and 100,000 selected from the group consisting of polyethylene glycol and mixtures of polyethylene glycol/polypropylene glycol, in said copolymer dispersion, and (3) recovering said aqueous ethylene-containing copolymer dispersion with viscosities above 20 Pas.

These and other objects of the invention will become more apparent as the description thereof proceeds.

THE DRAWINGS

Figure 2:
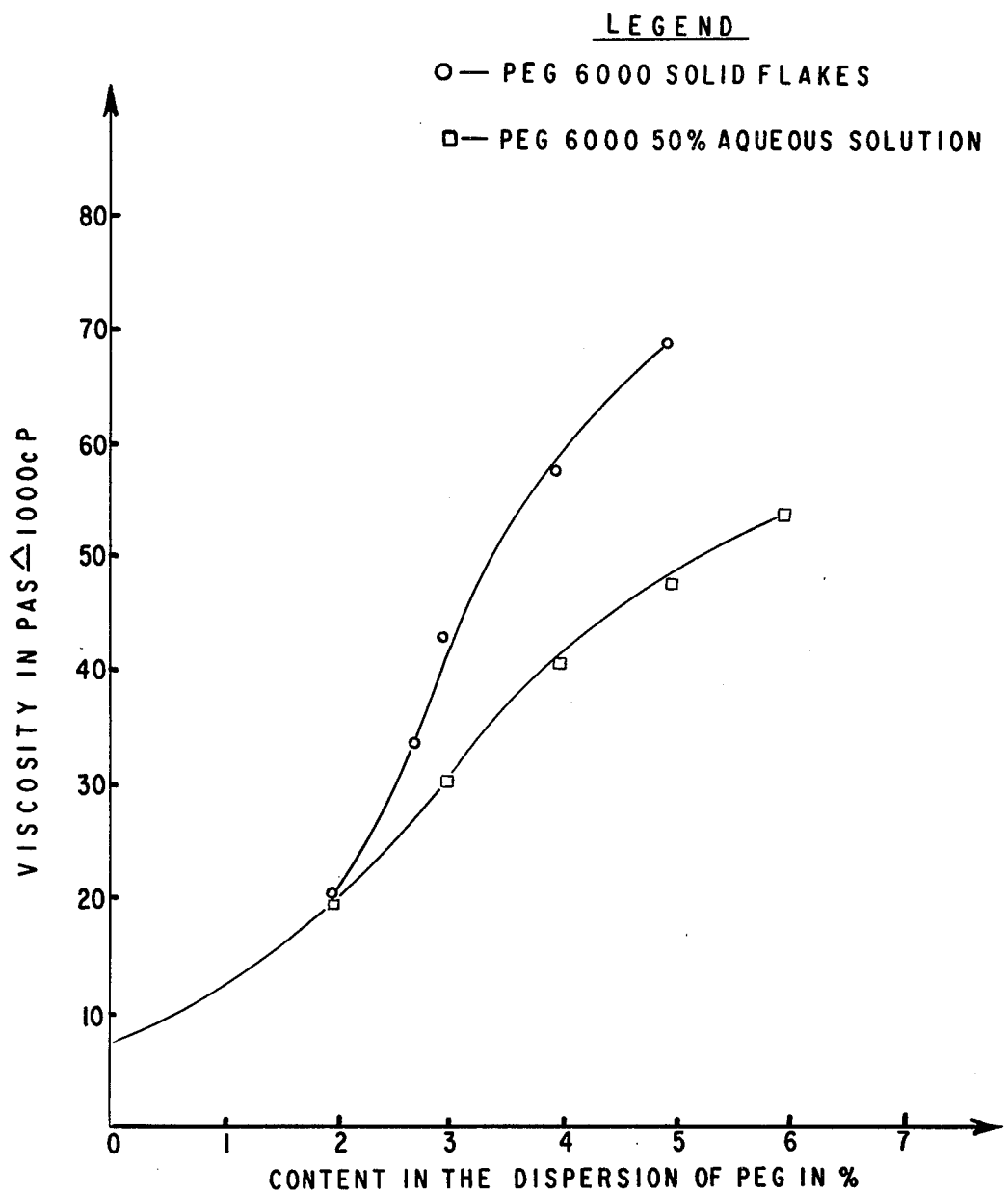

FIGS. 1 and 2 are graphs showing the increase in viscosity of ethylene-containing copolymer dispersions on the addition of small amounts of polyalkylene glycols thereto.

DESCRIPTION OF THE INVENTION

The subject of the present invention is a process for the preparation of aqueous ethylene-containing copolymer dispersions, preferably ethylene/vinyl acetate copolymer dispersions, with viscosities above 20 Pas (measured with a Brookfield viscosimeter at 10 rpm) up to a pasty consistency, characterized in that in a first step an ethylene-containing copolymer dispersion, preferably an ethylene/vinyl acetate copolymer dispersion, is prepared by polymerization in the presence of from 1% to 15% by weight of polyvinyl alcohol with a degree of hydrolyzation of 70% to 100% to a solids content of 30% to 60% by weight, and in a second step, from 1% to 8% by weight of water-soluble polyalkylene oxides with a molecular weight between 6,000 and 100,000 are evenly distributed in the copolymer dispersion, whereby the desired viscosity is obtained. The polyalkylene oxides to be considered in this context are polyethylene oxides and/or mixed polymers of ethylene oxide and propylene oxide, where the propylene oxide content in the mixed polymer may amount up to 20%.

More particularly, the present invention relates to a process for the preparation of an aqueous ethylene-containing copolymer dispersion with viscosities above 20 Pas (measured with a Brookfield viscosimeter at 10 rpm) which consists essentially of (1) polymerizing an aqueous monomer mixture of ethylene and at least one monomer copolymerizable with ethylene under conventional ethylene copolymerization conditions in the presence of from 1% to 15% by weight of polyvinyl alcohol with a degree of hydrolyzation of 70% to 100%, to a solids content of from 30% to 60% by weight, to give a copolymer dispersion, (2) evenly distributing from 1% to 8% by weight of water-soluble polyalkylene glycols having a molecular weight of between 6,000 and 100,000 selected from the group consisting of polyethylene glycol and mixtures of polyethylene glycol/polypropylene glycol, in said copolymer dispersion, and (3) recovering said aqueous ethylene-containing copolymer dispersion with viscosities above 20 Pas.

Surprisingly, a very definite increase of the viscosity occurs in ethylene-containing copolymer dispersions which were polymerized in the presence of polyvinyl alcohol upon addition of polyalkylene oxide in amounts according to the invention. This viscosity may lie several powers of ten above the characteristic viscosity of the corresponding polyalkylene oxide solutions. This distinguishes the thickening agent from other polymers which do not cause this definite increase of viscosity in ethylene-containing copolymer dispersions even in the presence of polyvinyl alcohol.

The ethylene-containing copolymer dispersions are dispersions of ethylene/vinyl chloride polymers or ethylene/vinyl alkanoate ester polymers with 1 to 18 carbon atoms in the alkanoic acid group. In addition, the ethylene/vinyl alkanoate ester polymers with 1 to 18 carbon atoms in the alkanoic acid group may contain at least one additional polymerized monomer, that is a mono-ethylenically unsaturated monomer copolymerizable with ethylene and vinyl alkanoate esters, such as vinyl chloride, acrylic acid, lower alkyl acrylates, maleic acid, mono- and di- lower alkyl maleates, fumaric acid, mono- or di- lower alkyl fumarates or mono- or di- lower alkyl itaconates, or the ethylene/vinyl chloride polymers could contain at least one additional monomer, that is a mono-ethylenically unsaturated monomer copolymerizable with ethylene and vinyl chloride, such as acrylic acid, lower alkyl acrylates, maleic acid, mono- and di- lower alkyl maleates, fumaric acid, mono- and di- lower alkyl fumarates and mono- and di- lower alkyl itaconates. The ethylene-containing copolymer dispersions should contain from 8% to 35%, preferably from 10% to 25%, by weight of the copolymer of ethylene units.

The process is preferably directed to the preparation of high viscosity ethylene/vinyl acetate copolymer dispersions having an ethylene content of from 8% to 35%, preferably from 10% to 25%, of the copolymer.

The viscosity measurements were made on a Brookfield viscosimeter at 10 rpm and reported in Pas units, which are equivalent to 1,000 centipoises. It appears, however, that the viscosity measurements on mixtures with increasing polyalkylene oxide content are falsified at measured viscosities above 60 Pas by the so-called slide flow which results in excessively low viscosity readings though the dispersion mixtures obviously continue to increase in viscosity, in some cases are even thickened to a pasty consistency.

The polymerization of the ethylene-containing monomer dispersions is executed, for example, in such a way that protective colloid solutions and/or aqueous emulsifying agents, reducing agents, in some cases also heavy metal salts and vinyl esters (or vinyl chloride) are introduced and heated to the polymerization temperature with stirring. After the addition of ethylene, the addition of measured amounts of peroxide is begun. The course of the polymerization is regulated by the dosage of the peroxide catalyst. In some cases, a short term postpolymerization follows the end of the catalyst dosage. The dosage of the peroxide catalyst is most frequently done in the form of dilute solutions.

The polymerization temperature lies usually between 0° C and 100° C, preferably 10° C to 60° C. The pressure of the ethylene is between 3 and 150 atm, preferably 5 to 100 atm. The ethylene may be added in the beginning in a single operation, or added continuously, while maintaining the pressure, until a certain percentage of the vinyl ester (or vinyl chloride) has reacted, and, if so desired, also past the complete reaction of the vinyl ester. Continuation of polymerization without ethylene or polymerization with varying ethylene pressures are also possible.

The dispersing agents which may be used are all the emulsifying agents and protective colloids customarily used in emulsion polymerization, as long as the protective colloids include the critical polyvinyl alcohol with a degree of hydrolyzation of between 70% and 100% in amounts of between 1% and 15% by weight, preferably between 3% and 8% by weight. Other protective colloids may additionally be present also, such as water-soluble cellulose derivatives, water-soluble starch ethers, polyacrylic acid copolymers with acrylamide and/or lower alkyl acrylates, poly-N-vinyl compounds of open chain or cyclic carboxylic acid amides.

The emulsifying agents which may optionally be present include anionic, cationic, and nonionic surface-active compounds. Suitable anionic surface-active compounds or emulsifying agents are the alkyl sulfates, mono-sulfates of alkanediols with more than 10 carbon atoms, alkyl sulfonates, alkylphenyl sulfonates, alkyl disulfonates and alkylphenylene disulfonates, and di-alkyl sulfosuccinic acid esters, all with 9 to 20 carbon atoms for each alkyl group. Suitable cationic surface-active compounds or emulsifying agents are, for example, alkylammonium salts, alkylphosphonium salts, and alkylsulfonium salts.

The nonionic surface-active compounds or emulsifying agents are, for example, adducts of 5 to 50 mols of ethylene and/or propylene oxide onto straight or branched chain alkyl alcohol with 6 to 22 carbon atoms, onto alkyl phenols, onto higher fatty acids, onto higher fatty acid amides, as well as onto primary or secondary higher fatty acid amides. The presence of polyalkylene oxides during the polymerization is naturally excluded.

Redox catalysts suitable for polymerization consist of water-soluble reducing agents, if so desired with additional heavy metal ions and a peroxide component.

The reducing agents are, for example, water-soluble alkali metal or alkaline earth metal salts of sulfites, bisulfites, pyrosulfites, dithionites, dithionates, thiosulfates, formaldehyde sulfoxylate, as well as molecular hydrogen absorbed on colloidally distributed noble metal sols of the eighth group of the periodic table.

The heavy metal ions, e.g., iron, copper, nickel, cobalt, chromium, molybdenum, vanadium, cerium, are most frequently used as chlorides and sulfates.

Suitable peroxide components are, for instance, inorganic per-compounds, for example, hydrogen peroxide, sodium, potassium, and ammonium persulfate, alkali metal perborates, alkali metal percarbonates, and organic per-compounds, for example, tert-butyl hydroperoxide, di-tert-butyl peroxide, acetyl peroxide, lauryl peroxide. Preferably, persulfates and tert-butyl hydroperoxide are used as per-compounds.

The concentrations of the reducing agents employed in the polymerization are from 0.01% to 0.5% by weight, based on the weight of the polymerizate, those of the heavy metal salts are below 0.001% by weight, based on the weight of the polymerizate, and those of the per-compounds are from 0.005% to 0.5% by weight, based on the weight of the polymerizate. The amount of reducing agent is here preferably at least one reducing equivalent per one oxidation equivalent, based on the total amount of oxidizing agent required.

The pH value may be regulated by the addition of buffer salts, such as alkali metal acetates, alkali metal carbonates, alkali metal phosphates, or of alkaline liquors, such as sodium hydroxide, ammonium hydroxide, or of acids, such as hydrochloric acid, acetic acid, formic acid. Preferably, the polymerization should proceed at a pH value of 3 to 6. The known regulators for the control of the molecular weight, like aldehydes such as lower alkanals, chlorinated hydrocarbons or mercaptans, may be included.

By the new process, high percentage ethylene/vinyl ester copolymer dispersions with up to 70% solids content can be prepared. The dispersions prepared according to the invention form flexible films with, in relation to their ethylene content, improved tear resistance and very high fatigue limit under static load.

For the purpose of the invention, the polymer dispersions should have a solids content between 30% and 60% by weight. During the polymerization, primary emulsifying agents or stabilizers for the monomer may also be present during the preparation of the aqueous dispersion.

The second step of the process according to the invention consists of the addition of 1% to 8% by weight, preferably 2% to 6% by weight, of water-soluble polyalkylene oxides to the polymerisate prepared according to the first step. Here, it does not matter if the polyalkylene oxide is added as a solid, melt, or in the form of an aqueous solution. Care has, however, to be taken in the case of addition in the form of an aqueous solution since, in this method, the dispersion is diluted by the amount of water contained in the polyalkylene oxide solution. On the other hand, the distribution of the viscosity-increasing solution is facilitated by the addition of an aqueous polyalkylene oxide solution as compared to the addition of the solid substances, or the molten material. Polyalkylene oxides with a molecular weight of between 6,000 and 100,000 can be used. Naturally, an increase of viscosity occurs also with the addition of polyalkylene oxides with molecular weights above 100,000. However, the addition of these polyalkylene oxides with greater molecular weight is more difficult to handle. Polyalkylene oxides with molecular weights below 6,000 are no more active or cause only slight thickening. In the use of such polyalkylene oxides with lower molecular weights considerably larger amounts of additive are needed, provided that they show any thickening effect at all. Preferably, polyalkylene oxides with molecular weights between 10,000 and 30,000 are used. Generally, amounts of 1% to 8% by weight polyalkylene oxide are added to the polymer dispersion, where the addition of polyalkylene oxides with lower molecular weights requires the larger additions and vice versa. Naturally, amounts above 8% by weight of polyalkylene oxide may be added to the polymer dispersion, however, frequently a pasty consistency of the polymer dispersion is achieved already at 8% by weight. Preferably, additions of between 2% and 6% by weight are utilized. Even with a polyethylene oxide having a molecular weight of 6,000, viscosities of 60 to 70 Pas can usually be obtained at a 6% level.

The viscosities of the polymer dispersions prepared according to the invention lie considerably higher than the viscosities which can be achieved by the addition of other water-soluble high molecular weight polymers, like, for instance, cellulose derivatives or polyvinyl pyrolidone.

In the figures, FIG. 1 is a graph showing the increase in viscosity of an ethylene/vinyl acetate copolymer dispersion with a 48% solids content, 5% by weight of polyvinyl alcohol with a degree of hydrolysis of 90, and 18% by weight of ethylene in the copolymerizate, with the addition of various amounts of a polyethylene glycol having a molecular weight of 20,000, as added in various forms. FIG. 2 is a graph showing the increase in viscosity of the same ethylene/vinyl acetate copolymer dispersion with the addition of various amounts of a polyethylene glycol having a molecular weight of 6,000, as added in flake form and as a 50% aqueous solution. These graphs are a plot of the values shown in Table I of Example 2.

The invention will be further elucidated by the following examples, which, however, are not limiting of the invention in any respect.

EXAMPLE 1

An autoclave having a stirrer and equipment for dosing materials and removing samples as well as heating and cooling means is employed. A solution of 6 kg of polyvinyl alcohol (PVA) (with a viscosity of 20 cPs for an aqueous 4% solution and a saponification number of 100) in 100 liters of water and 0.24 kg of sodium sulfite were added to the autoclave. After flushing the autoclave with nitrogen, 100 kg of vinyl acetate were added with stirring. The temperature was raised to 50° C, and ethylene was added under pressure up to a pressure of 45 atm. The polymerization was initiated and maintained by a continuous, but varied, addition of a solution of 90 gm of t-butyl hydroperoxide in a mixture of 6 kg of methanol and 6 kg of water while the temperature was maintained at 50° C by utilization of the cooling capacity of the reactor. The amounts of hydroperoxide solution which are necessary to maintain the reaction correspond to the utilization and vary considerably. So, during the first hour an addition of 45 gm of t-butyl hydroperoxide was made, while in the second and third hours 20 gms were needed. The rate of polymerization immediately reacts to an increase or decrease of the peroxide addition. An increase of the pressure during the polymerization is avoided by adjustment of the rate of polymerization and rate of cooling. After about 2.5 hours, the dispersion reached a solids content of 45%. The rate of reaction now started to flatten out and the peroxide dosage was increased in such a way that an additional 25 gm of peroxide were added within one hour. After one hour of postpolymerization, the mixture was cooled and excess ethylene was removed by relieving the pressure and flushing with nitrogen.

A stable dispersion was obtained with a residual monomer content of 0.3%. The ethylene content of the polymer is 15%, the K value, 100.

EXAMPLE 2

To an ethylene/vinyl acetate copolymer dispersion with 48% by weight solids content, 5% by weight of polyvinyl alcohol with a degree of hydrolization of 90%, and 18% by weight ethylene in the copolymerizate, was added polyethylene glycol in the amounts indicated in Table 1. The resulting viscosities are also compiled in Table 1. The ethylene/vinyl acetate copolymer dispersion was prepared following the procedures of Example 1. The added polyethylene glycol had a molecular weight of 20,000 in one case, and of 6,000 in others. The polyethylene glycol with molecular weight 20,000 was added in the form of flakes, in form of a melt, or in the form of either a 50% or 20% aqueous solution. The polyethylene glycol with molecular weight 6,000 was added in the form of flakes or as a 50% aqueous solution. In the graph of FIGS. 1 and 2, the increase of the viscosity of the ethylene/vinyl acetate copolymer dispersion is shown in dependence on the added amount of polyethylene glycol. From Table 1 as well as from the graphic representation, the enormous increase of viscosity in the presence of small polyethylene glycol additions is clearly apparent.

TABLE 1

Addition of polyethylene glycol (PEG) to an ethylene/vinyl acetate copolymer dispersion with 48% by weight solids content, 5% by weight of polyvinyl alcohol with a degree of hydrolysis of 90, and 18% by weight of ethylene in the copolymerizate:

| | Viscosity (Pas ≙ 1,000 cP) measured according to Brookfield 10 rpm | | | | | |
|---|---|---|---|---|---|---|
| PEG in % by Wt. In 100 Parts | PEG Molecular Weight 20,000 | | | | PEG Molecular Weight 6,000 | |
| | Flakes | Melt | Aqueous Solution 50% | 20% | Flakes | 50% Aqueous Solution |
| 0 | 7.0 | 7.0 | 7.0 | 7.0 | 7.0 | 7.0 |
| 1 | 21.2 | 20.8 | 20.4 | 11.7 | | |
| 1.5 | 35.0 | | 30.5 | 20.0 | | |
| 2 | 45.6 | 50.5 | 38.5 | 20.8 | 20.4 | 19.8 |
| 3 | 70.8 | 69.5 | 54.0 | 24.8 | 42.5 | 30.0 |
| 4 | | | 67.2 | 26.7 | 57.2 | 40.5 |
| 5 | | | | | 68.0 | 47.5 |
| 6 | | | | | | 53.5 |

FIG. 1 is a graph of the above values where the PEG has a molecular weight of 20,000 and FIG. 2, that where the PEG has a molecular weight of 6,000.

EXAMPLE 3

An ethylene/vinyl acetate copolymer dispersion with 50% by weight solids content, 16% by weight of ethylene in the copolymerizate and 5% by weight polyvinyl alcohol with a degree of hydrolization of 84% was employed. This ethylene/vinyl acetate copolymer dispersion was prepared following the procedures of Example 1. An ethylene oxide/propylene oxide polymer with 20% by weight propylene oxide in the polymer and a molecular weight of 16,000 was added to the copolymer dispersion. The starting and resulting viscosities for varying added amounts of the polyalkylene oxide as a 50% aqueous solution are shown in Table 2. Here too, a large increase of viscosity occurs with only small amounts of added polyalkylene oxide.

TABLE 2

Addition of an ethylene oxide/propylene oxide mixed polymer with 20% by weight propylene oxide and a molecular weight of 16,000 (as a 50% aqueous solution) to an ethylene/vinyl acetate copolymer dispersion with 50% by weight solids content, 16% by weight of ethylene in the copolymerizate, and 5% by weight of polyvinyl alcohol with a saponification degree of 84%:

| Addition Weight Parts | Viscosity Pas ($\wedge$1,000 cP) measured with Brookfield RVT 10 rpm |
|---|---|
| 0 | 7.1 |
| 1.5 | 12.9 |
| 2.0 | 21.8 |
| 3.0 | 49.0 |
| 5.0 | — |

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the preparation of an aqueous ethylene-containing copolymer dispersion with viscosities above 20 Pas (measured with a Brookfield viscosimeter at 10 rpm) which consists essentially of (1) polymerizing an aqueous monomer mixture of ethylene and at least one monomer copolymerizable with ethylene under conventional ethylene copolymerization conditions in the presence of from 1% to 15% by weight of polyvinyl alcohol with a degree of hydrolyzation of 70% to 100% and in the absence of polyalkylene oxides to a solids content of from 30% to 60% by weight, to give a copolymer dispersion, (2) evenly distributing from 1% to 8% by weight of water-soluble polyalkylene glycols having a molecular weight of between 6,000 and 100,000 selected from the group consisting of polyethylene glycol and mixtures of polyethylene glycol/polypropylene glycol, in said copolymer dispersion, and (3) recovering said aqueous ethylene-containing copolymer dispersion with viscosities above 20 Pas.

2. The process of claim 1 wherein said ethylene-containing copolymer contains from 8% to 35% by weight of the copolymer of ethylene units.

3. The process of claim 1 wherein said ethylene-containing copolymer contains from 10% to 25% by weight of the copolymer of ethylene units.

4. The process of claim 1 wherein said ethylene-containing copolymer is selected from the group consisting of ethylene/vinyl chloride copolymers, ethylene/vinyl alkanoate ester copolymers with 1 to 18 carbon atoms in the alkanoic acid group, copolymers of ethylene, vinyl chloride and a mono-ethylenically-unsaturated monomer copolymerizable therewith, and copolymers of ethylene, vinyl alkanoates with 1 to 18 carbon atoms in the alkanoic acid group, and a mono-ethylenically-unsaturated monomer copolymerizable therewith.

5. The process of claim 1 wherein said ethylene-containing copolymer is an ethylene/vinyl acetate copolymer having from 10% to 25% by weight of ethylene units.

6. The process of claim 1 wherein said polyvinyl alcohol is employed in an amount of from 3% to 8% by weight of the copolymerizate.

7. The process of claim 1 wherein said water-soluble polyalkylene glycol has a molecular weight of from 6,000 to 30,000 and is employed in an amount of from 2% to 6% by weight.

8. The process of claim 7 wherein said water-soluble polyalkylene glycol has a molecular weight of from 10,000 to 30,000.

9. The process of claim 1 wherein said water-soluble polyalkylene glycol is polyethylene glycol having a molecular weight of from 10,000 to 30,000.

10. The process of claim 1 wherein said water-soluble polyalkylene glycol is a mixture of polyethylene glycol and polypropylene glycol with from 0.5% to 20% by weight of polypropylene glycol units.

11. The process of claim 1 wherein said copolymer dispersion obtained in step (1) had a viscosity of about 7 Pas.

* * * * *